(12) United States Patent
DeLacy

(10) Patent No.: US 9,329,310 B1
(45) Date of Patent: May 3, 2016

(54) MULTILAYERED PLEXCITONIC NANOPARTICLES AND METHODS OF PRODUCING SAME FOR CONTROLLING PLASMON-EXCITON DISTANCE

(71) Applicant: U.S. Army Edgewood Chemical and Biological Command, APG, MD (US)

(72) Inventor: Brendan G. DeLacy, Havre de Grace, MD (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 185 days.

(21) Appl. No.: 14/337,847

(22) Filed: Jul. 22, 2014

Related U.S. Application Data

(60) Provisional application No. 61/858,692, filed on Jul. 26, 2013.

(51) Int. Cl.
*G02B 5/00* (2006.01)
(52) U.S. Cl.
CPC ........... *G02B 5/008* (2013.01); *Y10T 428/2982* (2015.01)
(58) Field of Classification Search
CPC .......................... G02B 5/008; Y10T 428/2982
USPC .................................................. 428/402, 403
See application file for complete search history.

(56) References Cited

U.S. PATENT DOCUMENTS

| | | | | |
|---|---|---|---|---|
| 2010/0003316 | A1* | 1/2010 | Vo Dinh | A61K 41/0028 514/1.1 |
| 2011/0263920 | A1* | 10/2011 | Bourke, Jr. | A61K 41/008 600/1 |
| 2014/0343479 | A1* | 11/2014 | Bourke | A61K 41/008 604/20 |

FOREIGN PATENT DOCUMENTS

EP         002913672       *  9/2015

OTHER PUBLICATIONS

B.G. Delacy et al. "Layer-by-layer self assembly of plexitonic nanoparticles" Opt. Express, 2013, vol. 21 (16), pp. 4536-4537.*

* cited by examiner

*Primary Examiner* — Leszek Kiliman
(74) *Attorney, Agent, or Firm* — Ulysses John Biffoni

(57) ABSTRACT

Multilayered nanoparticles and methods of producing same are provided for controlling plasmon-exciton distance. The nanoparticles include a silver core, a polyelectrolyte spacer layer exterior to the silver core, and a J-aggregate cyanine dye outer shell. This multilayer architecture served as a framework for manipulating the dual coupling of localized surface plasmon resonance exhibited by the silver core with the molecular exciton exhibited by the J-aggregate outer shell. The polyelectrolyte spacer layer promotes the formation of an excitonic J-aggregate while serving as a means of controlling the plasmon-exciton coupling strength through changing the distance between the core and the shell. An analytical expression based on Mie Theory and the Transfer Matrix Method is provided for describing the optical response of these multilayered nanoparticles. Computational and experimental results illustrate that the absorption wavelength of the J-aggregate form of the dye is dependent on both the distance of the dye layer from the silver core and the degree of dye aggregation.

11 Claims, 5 Drawing Sheets

MULTILAYERED PLEXCITONIC NANOPARTICLES AND METHODS OF PRODUCING SAME FOR CONTROLLING PLASMON-EXCITON DISTANCE

CROSS-REFERENCE TO RELATED APPLICATIONS

This application claims the benefit of priority to U.S. Provisional Patent Application No. 61/858,692 filed on Jul. 26, 2013, the entire contents of which are herein incorporated by reference.

GOVERNMENT INTEREST

The invention described herein may be manufactured, used, and/or licensed by or for the United States Government.

BACKGROUND

1. Technical Field

The present invention relates generally to nanoparticles for optoelectronic applications, and, more particularly, multilayered plexcitonic nanoparticles and layer-by-layer assembly methods of producing same for controlling the resulting plasmon-exciton coupling strength of the synthesized nanoparticles.

2. Description of the Related Art

Silver (Ag) and gold (Au) nanoparticles have been studied extensively for their unique optical properties in the ultraviolet, visible, and infrared regions of the electromagnetic spectrum. These properties arise from the collective oscillation of conduction band electrons throughout the particle in response to optical excitation, a process commonly termed as localized surface plasmon resonance. Resonance occurs when the frequency of incident radiation is at or near the frequency of the electronic oscillation. This resonance results in a strong enhancement of the local electric field. This property may be used in applications such as surface-enhanced Raman scattering (SERS), surface-enhanced fluorescence, and the study of nonlinear optical response. Additionally, the size and morphology of the silver and gold nanoparticles have a significant impact on surface plasmon resonance frequency and therefore have a great significance in such fields as sensors and photonic devices.

Cyanine dyes are commonly used in spectral sensitization and have potential application in novel optoelectronic materials. Structurally, these dyes consist of two heterocyclic units that are connected by an odd number of methine groups. The color of the dye is primarily determined by the length of the polymethine chain. A particularly intriguing property of cymine dyes is their tendency to aggregate under certain conditions in solution. These so called J-aggregates exhibit a narrow absorption band that is red-shifted with respect to the monomer absorption band. The shift in absorption of the aggregate has been described by a Frenkel exciton model in which excited states are formed by the coherent coupling of molecular transition dipoles.

Multilayered nanoparticles, composed of both a noble metal and a J-aggregate dye, provide a unique framework for studying plasmon-exciton interactions. Numerous structures exhibiting these plasmon-exciton interactions have been fabricated and studied in recent years. Some nanostructures have involved the direct adsorption of J-aggregate dyes onto the surface of sliver nanoparticles with varying geometries. One example of this is the work reported by J. Hranisavljevic, N. M. Dimitrijevic, G. A. Wurtz, and G. P. Wiederrecht, "Photoinduced charge separation reactions of j-aggregates coated on silver nanoparticles," J. Am. Chem. Soc. 124(17), 4516-4537 (2002). Other efforts have focused on the aggregation of cyanine dyes onto complex geometries. For example, cyanine dyes were adsorbed onto silica core/gold shell nanoparticles in the work reported by N. T. Fofang, T. H. Park, O. Neumann, N. A. Mirin, P. Nordlander, and N. J. Halas, "Plexcitonic nanoparticles: Plasmon-exciton coupling in nanoshell-j-aggregate complexes." Nano Lett. 8(10), 3481-3487 (2008). In these studies, it was observed that the absorption spectra of these composite nanoparticles were not the simple sum of the absorption of the metal nanoparticle and the J-band of the aggregate. Rather, strong plasmon-exciton interactions (plexcitons) were observed, resulting in a shift in the absorption bands of the individual plasmon and exciton resonances. A more recent study by Yoshida et al. explored the impact of inserting a spacer layer or inner shell between a gold core particle (Au) and an outer J-aggregate dye layer or outer shell. This work is reported by A. Yoshida, Y. Yonezawa, and N. Kometani, "Tuning of the spectroscopic properties of composite nanoparticles by the insertion of a spacer layer: effect of exciton-plasmon coupling," Langmuir 25(12), 6683-6689 (2009). The spacer layer used in the study was a cationic thiol which promoted the J-aggregation of anionic cyanine dyes onto the surface of the nanocomposite. The spectral line shape of these composites was dependent on the strength of the plasmon-exciton coupling between the metal core and the J-aggregate shell.

The metallic core composition and size, excitonic shell composition, degree of J-aggregate formation within the excitonic shell, and distance between the plasmonic core and excitonic shell are among the factors that play the most significant roles in controlling optical response. Metallic core particles and excitonic dyes of varying composition are readily available. Selection of core particles and excitonic dyes for a given application may be based on the intrinsic optical properties of the material. In terms of particle shape, a range of metallic core shapes such as spheres, rods, and platelets may be fabricated using well documented solution-based techniques such as that reported in P. C. Lee and D. Meisel, "Adsorption and surface-enhanced Raman dyes on silver and gold sols," J. Phys. Chem. 86(17), 3391-3395 (1982). However, spacer layer thickness and its impact on plasmon-exciton coupling in these nanoparticle systems have not been studied systematically. The spacer layer must serve the two-fold purpose of promoting the formation of a J-aggregate shell while also creating a distance, of specific and desired dimension, between the metallic core and the excitonic shell.

Accordingly, there is a need for systematic methods to build multilayered plexcitonic nanoparticles while controlling plasmon-exciton distances. The term "plexcitonic nanoparticles" as used herein refers to the ability to control in the synthesis the plasmon-exciton coupling strength of the synthesized nanoparticles. Methods to mathematically model the behavior of such nanoparticles are also needed in order to analyze and design such materials for various applications. Such applications may include use of the multilayered plexcitonic nanoparticles in optical filters, displays, obscurants, solar cells, and other applications.

SUMMARY

In view of the foregoing, exemplary embodiments of multilayered plexcitonic nanoparticles are provided along with layer-by-layer assembly methods, analysis, and results. The present invention may be embodied in the form of plexcitonic nanoparticles in the shape of spheres, rods, platelets, and other geometries. The plexcitonic nanoparticles may have one or more layers of alternating polyelectrolytes to produce a desired plasmon-exciton coupling strength. A layer-by-layer assembly method is taught to achieve the desired plasmon-exciton coupling strength. These and other aspects of the present invention will be better appreciated and understood when considered in conjunction with the following description and the accompanying drawings. It should be understood, however, that the following descriptions, while indicating exemplary embodiments and numerous specific details thereof, are given by way of illustration and not of limitation. Many changes and modifications may be made within the scope of the embodiments herein without departing from the spirit thereof, and the present invention includes all such modifications.

DETAILED DESCRIPTION

The present invention and the various features and advantageous details thereof are explained more fully with reference to non-limiting embodiments that are illustrated in the accompanying drawings and detailed in the following description. Descriptions of well-known materials and methods are omitted so as to not unnecessarily obscure the embodiments herein. The examples used herein are intended merely to facilitate an understanding of ways in which the embodiments herein may be practiced and to further enable those of skill in the art to practice the present invention. Accordingly, the examples should not be construed as limiting the scope of the present invention.

The present invention as taught herein employs a variably thick polyelectrolyte spacer layer as a means of building multilayered plexcitonic nanoparticles and controlling plasmon-exciton distance. Alternating cationic poly(diallyldimethyl ammonium chloride) (PDADMAC) and anionic poly(styrene sulfonate) (PSS) are used as a spacer layer between a silver core and a J-aggregate outer shell. The layer-by-layer self-assembly of these oppositely charged polyelectrolytes is taught herein. The thickness of the polyelectrolyte spacer layer is controlled by varying the number of PDADMAC/PSS layers that are adsorbed. The outer J-aggregate shell is formed by adsorbing the cationic form of 1,1'-diethyl-2,2'-cyanine iodide (PIC) onto the outermost anionic PSS layer.

Figure 1:
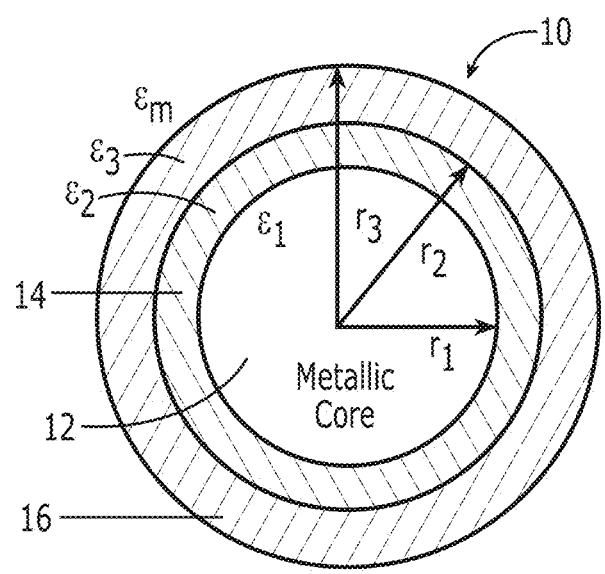
FIG. 1 is a schematic of a double-shell structure in accordance with the present invention.

Turning to FIG. 1, a schematic of a double-shell structure 10 in accordance with the present invention is illustrated. The schematic of FIG. 1 is not to scale as it is used to illustrate the basic arrangement of double-shell structure 10 and nomenclature used for denoting the geometry and dielectric function of the layers that comprise double-shell structure 10. As illustrated in FIG. 1, double-shell structure 10 is composed of a silver metallic core 12, a spacer layer consisting of alternating layers PDADMAC/PSS polyelectrolytes 14, and a 1,1'-diethyl-2,2'-cyanine iodide (PIC) exterior shell 16. The outer radius and dielectric function of individual layers are denoted $r_i$ and $\epsilon_i$, respectively, where i equals 1 for the silver metallic core, i equals 2 for spacer layer 14, and i equals 3 for exterior shell 16.

Figure 2:
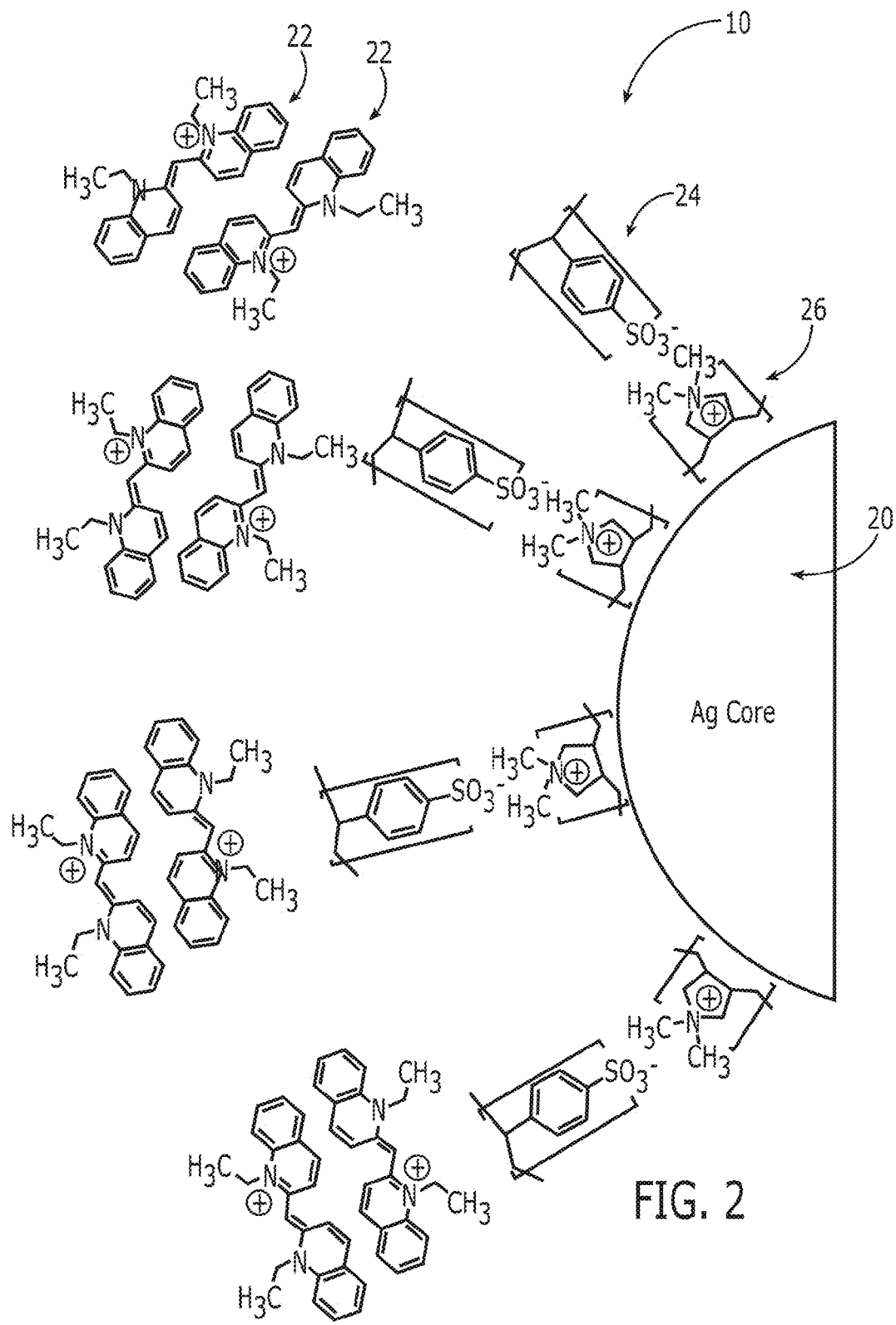
FIG. 2 is a schematic illustrating one half of the double-shell structure in accordance with the present invention in which the spacer layer is shown in formation with first and second spacer layers forming over the silver metallic core and an exterior shell in formation.

Turning to FIG. 2, a schematic illustrating one half of the double-shell structure 10 in accordance with the present invention is provided to illustrate greater detail in its formation. Double-shell structure 10 includes a silver metallic core 20. The spacer layer is shown in formation with PDADMAC 26 as the first layer over the silver metallic core 20. PSS 24 forms the next layer, exterior to the PDADMAC 26 layer. PIC or 1,1'-diethyl-2,2'-cyanine iodide 22 forms the final exterior shell.

While a spherical double-shell structure 10 is illustrated in FIGS. 1 and 2, the use of a polyelectrolyte spacer layer as taught herein may be incorporated into a wide range of core-shell systems, regardless of geometry. By way of example, instead of a sphere as illustrated here, the plexcitonic nanoparticles may be in the shape of rods, platelets, or other shapes. In addition, instead of one polyelectrolyte spacer layer as illustrated here, the plexcitonic nanoparticles may have two or more spacer layers of alternating polyelectrolytes to produce a desired plasmon-exciton coupling strength. In addition, the composition may vary from that illustrated. Accordingly, the present invention may be used as a means of manipulating plasmon-exciton coupling in a wide range of multilayered plexcitonic structures.

In order to explain the measured absorption features of the Ag/polyelectrolyte/PIC composite nanoparticles, Mie Theory and the Transfer Matrix Method are used to calculate the optical response of these multilayered nanospheres. Numerical simulations yield good agreement with experimental results. Specifically, the impact of polyelectrolyte spacer layer thickness on the shift of the exciton frequency was elucidated. These results demonstrate that a polyelectrolyte spacer layer as taught herein provides a means for tuning plasmon-exciton coupling in colloidal suspensions of multilayered plexcitonic nanoparticles.

Having illustrated the structure of the present invention, attention is now turned to the method of layer-by-layer assembly for controlling plasmon-exciton distance. The materials used in this example of layer-by-layer assembly are silver nitrate, trisodium citrate tribasic dihydrate, sodium poly(styrene sulfonate) (PSS, MW~70,000), poly(diallyldimethyl ammonium chloride) (PDADMAC, medium molecular weight 26062-79-3), sodium phosphate monobasic dihydrate, sodium phosphate dibasic dihydrate, and 1,1'-diethyl-2,2'-cyanine iodide; all of which are commercially available and may be purchased from sources such as, but not limited to, Sigma Aldrich (St. Louis, Mo.).

The first step in the process as taught herein is to prepare silver nanoparticles by chemically reducing positively charged silver ions in aqueous solution. The result of this step is referred to herein as silver colloidal suspension or sol. This step may be performed as follows: Dissolve approximately 110 mg of AgNO3 in 400 mL of deionized $H_2O$ (18MΩ) and place the resulting solution in a flask, such as a 1 liter 3-neck flask. Next, place a condenser tube, such as a 250 mm jacket length condenser tube, on the center neck of the flask to minimize evaporation losses. An addition funnel, containing 10 mL of 1% (wt/wt) trisodium citrate solution, is then attached to a second neck of the 3-neck flask. Stir the solution magnetically and heated it to 100° C. using a heating jacket and temperature controller while refluxing. Once the boiling point is reached, slowly add drop-wise the trisodium citrate solution. Heat and stir the mixture for an additional hour at 100° C. Cool to room temperature while stirring for an additional hour.

The second step in the process is to separately prepare a standard solution of 1,1'-diethyl-2,2'cyanine iodide, also referred to as PIC or standard solution of PIC. This can be achieved by dissolving 25 mg PIC in 100 mL phosphate buffer (pH=6.0).

The third step in the process is to form the silver core polyelectrolyte shell nanoparticles. This is achieved by exposing the silver colloidal suspension or sol from the first step to supersaturated concentrations of polyelectrolytes. First, transfer 10 mL Ag sol to a 50 mL polypropylene centrifuge tube. Centrifuged the sample at 4000 RPM for 15 minutes and remove the supernatant containing excess citrate. Add 5 mL of water to the tube followed by sonication. Next, add 5 mL of PDADMAC (1 mg/mL, 0.01 M NaCl) vigorously mixed the suspension for 1 minute. Allow the solution to stand for 30 minutes. Remove the supernatant and excess polymer by centrifugation (4000 RPM, 15 minutes). Perform two cycles of a 10 mL water addition, followed by sonication, centrifugation, and supernatant removal to ensure removal of excess polymer. Use the same solution concentration and steps that were used for the adsorption of PDADMAC for adsorption of additional polyelectrolyte layers. That is, PSS, 1 mg/mL, 0.01 M NaCl. Adsorb onto the silver particles combinations of 2, 4, 6, or more even numbers of polyelectrolyte layers. The term "adding alternating layers of PDADMAC and PSS to the silver colloidal suspension" is defined herein to mean at least one layer of PDADMAC and one layer of PSS, and any combination of even numbers of polyelectrolyte layers, such as 2, 4, and 6 layers as described in this step. These even number of layers may be denoted as $PDADMAC/PSS_{1,2,3,\ldots,n}$. The final part of this step is to resuspend the silver core polyelectrolyte shell nanoparticles in 5 mL water with sonication.

The fourth and final step in the process is to generate a J-aggregate shell on the silver core polyelectrolyte shell nanoparticles. This is done by incrementally adding the PIC formed in the second step to the silver core polyelectrolyte shell nanoparticle suspension formed in the third step until absorbance measurements yield an approximate absorbance of 0.5 to 1.5 absorbance units. This is accomplished by the following: dilute 1 mL of the suspension to 25 mL with water; place 3 mL of the diluted suspension in a 10 mm optical path quartz cuvette; add 100 μL aliquots of PIC standard (0.25 mg/mL) to the cuvette; mix and immediately take an absorbance measurement. Repeat until the absorbance measurements yield an approximate absorbance of 0.5 to 1.5 absorbance units.

The silver/polyelectrolyte/PIC composite nanoparticles also may be prepared by exposing silver core polyelectrolyte shell nanoparticles to PIC for a period of time to ensure adequate adsorption and aggregation of the dye onto the surface of the particles. This involves placing 5 mL of silver core polyelectrolyte shell nanoparticles in a 50 mL polypropylene centrifuge tube, followed by the addition of 5 mL of PIC standard. The samples are allowed to sit for a period of time such as 4 to 48 hours (24 hours were used in this example) to ensure adequate adsorption and aggregation of the dye onto the surface of the particles. The following day, the colloidal suspensions are centrifuged at 4000 RPM for 15 minutes, and the supernatant is discarded for removal of excess PIC standard. The solid nanoparticles are then washed with 10 mL water followed by sonication, centrifugation, and supernatant removal to ensure the removal of excess PIC. The particles are then resuspended in 5 mL water and sonicated. Finally, excessively large particles may be removed using a 0.22 μm Millex GP syringe filter. This procedure may be repeated for each of the Ag/polyelectrolyte/PIC nanoparticle combinations.

All ultraviolet and visible absorption spectra were measured in a quartz cuvette (10 mm optical path length) using a V-670 spectrophotometer (JASCO Co.). Spectra were measured from 190 nm to 800 nm. Transmission electron microscopy (TEM) images were observed in a FEI (Hillsboro, Oreg.) Tecnai 12 TWIN TEM operating at 100 kV. Samples were prepared by placing 5.0 μL of the particle solution onto a freshly ionized 300 copper mesh carbon coated/formvar grid. The samples were allowed to dry completely. Images were collected using an Olympus Soft Imaging System (Lakeland, Colo.) Megaview III digital camera. Figures were assembled in Adobe Photoshop using only linear adjustments in brightness and contrast. For the determination of zeta-potential, a Zetasizer Nano ZS (Malvern instruments) was used to measure the electrophoretic mobilities of colloidal particles. The mobility μ was converted into a ζ-potential using the Smoluchowski relation (ζ=μη/ε, where η is the viscosity of the solvent and ε is the permitivity of the solvent). The hydrodynamic radius was also determined using the Zetasizer Nano ZS instrument. This measurement is a dynamic light scattering technique. The results of these measurements are present in the drawings discussed herein.

Having taught the method of layer-by-layer assembly for controlling plasmon-exciton distance, attention is now turned to mathematical methods to predict and analyze the behavior of such materials. In order to calculate the optical response of the nanocomposites, Mie theory is generalized to multilayer nanospheres via the Transfer Matrix Method. For multilayer nanospheres, the electric field can be decomposed into orthogonal channels labeled by (σ, l), where σ takes TE or TM, and l=1, 2, 3, . . . n. The scattering and absorption cross-sections are the sum of contributions from each channel, and the extinction cross-section is the sum of scattering and absorption cross-sections:

$$\sigma_{sca} = \sum_{\sigma} \sum_{l=1}^{\infty} \frac{\lambda^2}{8\pi} (2l+1) |1 - r_{\sigma,l}|^2 \quad (1)$$

$$\sigma_{sca} = \sum_{\sigma} \sum_{l=1}^{\infty} \frac{\lambda^2}{8\pi} (2l+1) |1 - r_{\sigma,l}|^2 \sigma_{ext} = \sigma_{sca} + \sigma_{abs} \quad (2)$$

In order to determine $r_{\sigma,l}$, the electric field inside each shell is numerically decomposed into incoming and outgoing spherical waves with coefficients ($A_n$, $B_n$). The coefficients of adjacent shells are connected by the transfer matrix of that interface, whose elements are determined by the boundary condition of TE or TM modes:

$$\begin{bmatrix} A_{i+1} \\ B_{i+1} \end{bmatrix} = M_{i+1,i} \begin{bmatrix} A_i \\ B_i \end{bmatrix} \quad (3)$$

The transfer matrix of the entire system can be calculated by combining the transfer matrices of individual interfaces:

$$\begin{bmatrix} A_{n+1} \\ B_{n+1} \end{bmatrix} = M_{n+1}, M_{n,n-1} \ldots M_{3,2}, M_{2,1} \begin{bmatrix} A_1 \\ B_1 \end{bmatrix} = M \begin{bmatrix} A_1 \\ B_1 \end{bmatrix} \quad (4)$$

Given that the second kind of spherical Bessel function is singular at the origin, $A_1 = B_1 = 1$. Therefore, $$r_1 = \frac{B_{n+1}}{A_{n+1}} = \frac{M_{21} + M_{22}}{M_{11} + M_{12}} \quad (5)$$

Incorporation of the appropriate dielectric constant for the aggregated form of PIC is required for the total cross-section calculations. A expression to describe the red shifted energy of aggregate forms of cyanine dyes is:

$$\varepsilon = \varepsilon_0 - 2V \cos\left(\frac{\pi}{N_c + 1}\right) \quad (6)$$

Here V is the nearest neighbor coupling energy, $N_c$ is the number of coherently coupled molecules that make up the aggregate, and $\varepsilon_0$ is the frequency dependent dielectric constant of the monomer. Using this model for PIC, a red-shifted J-aggregate absorption peak at 575 nm is expected for aggregates composed of 14 or more dye molecules. This prediction is consistent with numerous experimental observations in which aggregated forms of PIC, both in solution and adsorbed onto surfaces, exhibit absorption at 575 nm. Hence, 575 nm was taken as the excitation wavelength of the J-aggregate for the complex frequency-dependent dielectric function of the PIC J-aggregate, which was approximated using:

$$\varepsilon(\omega) = \varepsilon_0 + \frac{f\omega_0^2}{\omega_0^2 - \omega^2 - i\omega_0\gamma\omega} \quad (7)$$

Here, $\varepsilon_0 = \varepsilon_{medium} = 1.85$, $\omega_0$ corresponds to the excitation frequency of the J-aggregate (corresponding to 575 nm), $\gamma$ is the relaxation rate, and f represents the oscillator strength. Literature values for $\gamma$ range from 0.01 to 0.02, and for f range from 0.01 to 1.

Figure 3A:
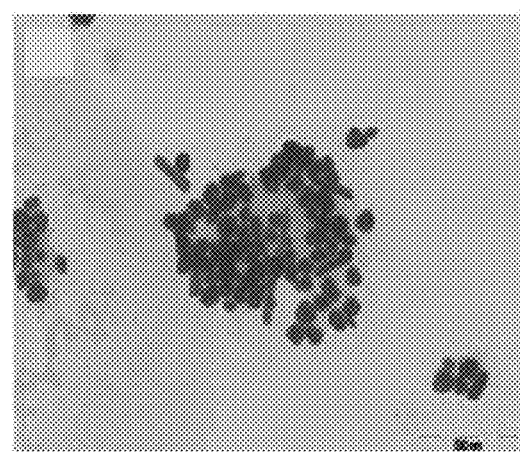
FIG. 3A is an image obtained from transmission electron microscopy (TEM) of silver nanoparticles in accordance with the present invention.
Figure 3B:
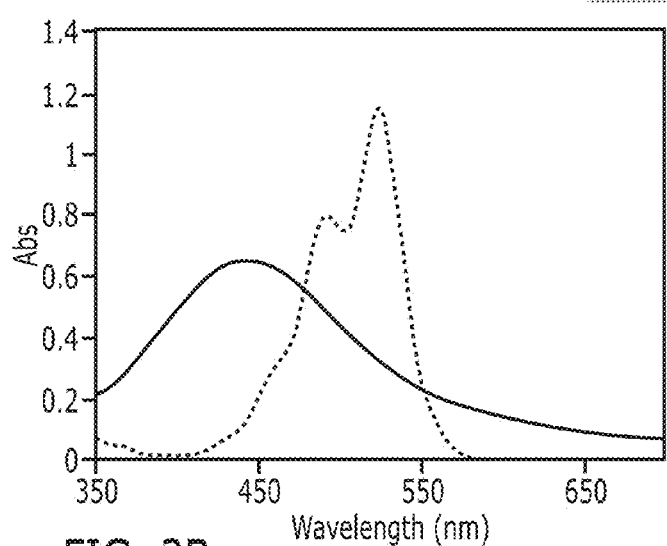
FIG. 3B is a graph of the absorbance spectra of the silver colloid and the cationic form of 1,1'-diethyl-2,2'-cyanine iodide, hereafter referred to as "PIC", illustrating absorption maximum $\lambda_{max}$ at 442 nm and 523 nm, respectively.
Figure 3C:
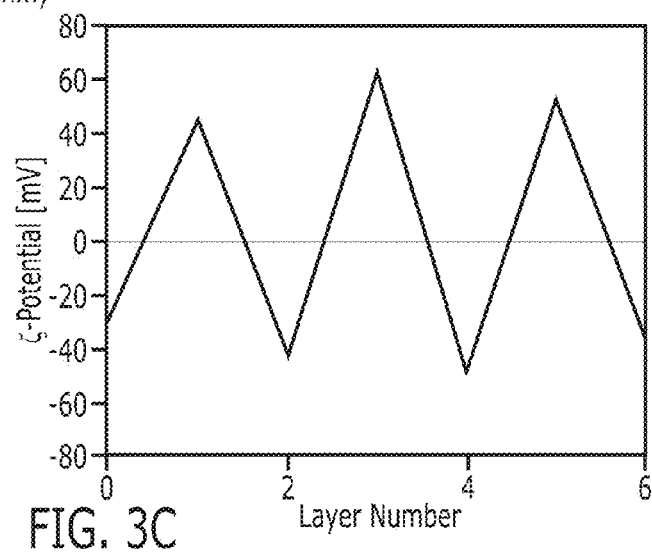
FIG. 3C is a graph of the zeta potential as a function of layer number for silver particles coated with alternating layers of cationic poly(diallyldimethyl ammonium chloride), hereafter referred to as "PDADMAC", and anionic poly(styrene sulfonate), hereafter referred to as "PSS".

Having taught the mathematical method to predict and analyze the behavior of the plexcitonic nanoparticles of the present invention, attention is now turned to a discussion and various illustrations of the results. The citrate reduction method as taught above yielded silver core nanoparticles with an average particle size of 54.5 nm and a standard deviation of 9.8 nm. FIG. 3A displays a transmission electron microscopy (TEM) image of the silver nanoparticles. As shown, most of the particles have a spherical shape with a relatively narrow size distribution, although a small amount of non-spherical particles are observed. FIG. 3B illustrates the absorbance spectra of the silver colloid as the solid line and the PIC standard as the dashed line. The silver colloid and PIC standard solutions are characterized by an absorption maximum $\lambda_{max}$ at 442 nm and 523 nm, respectively. Of particular note is the absence of the PIC J-aggregate peak, which is commonly observed at or near 575 nm. This observation is consistent with published data, as the concentration of the PIC standard in this solution is too low for the formation of the J-aggregate. FIG. 3C illustrates the electrokinetic potential or zeta ($\zeta$) potential as a function of layer number for silver particles coated with alternating layers of PDADMAC and PSS. Polyelectrolyte deposition of PDADMAC and PSS was performed in 0.01 M NaCl. The zeta potential alternates between positive and negative values for the sequential additions of PDADMAC and PSS, respectively.

As illustrated in FIGS. 1-3, the layer-by-layer self assembly of polyelectrolytes on colloidal particles provides a technique for building stable and functionalized multilayers on nanoparticles. The irreversible electrostatic interaction between cationic and anionic polyelectrolyte layers aid in stabilizing these films. The sequential addition of PDADMAC and PSS, with PSS forming the outermost polyelectrolyte layer, is used to control the thickness of the polyelectrolyte layer and to render the outer surface of the particles with a negative charge. The negative surface charge promotes the adsorption and J-aggregation of the cationic PIC dye onto the surface of the particles.

Figure 4:
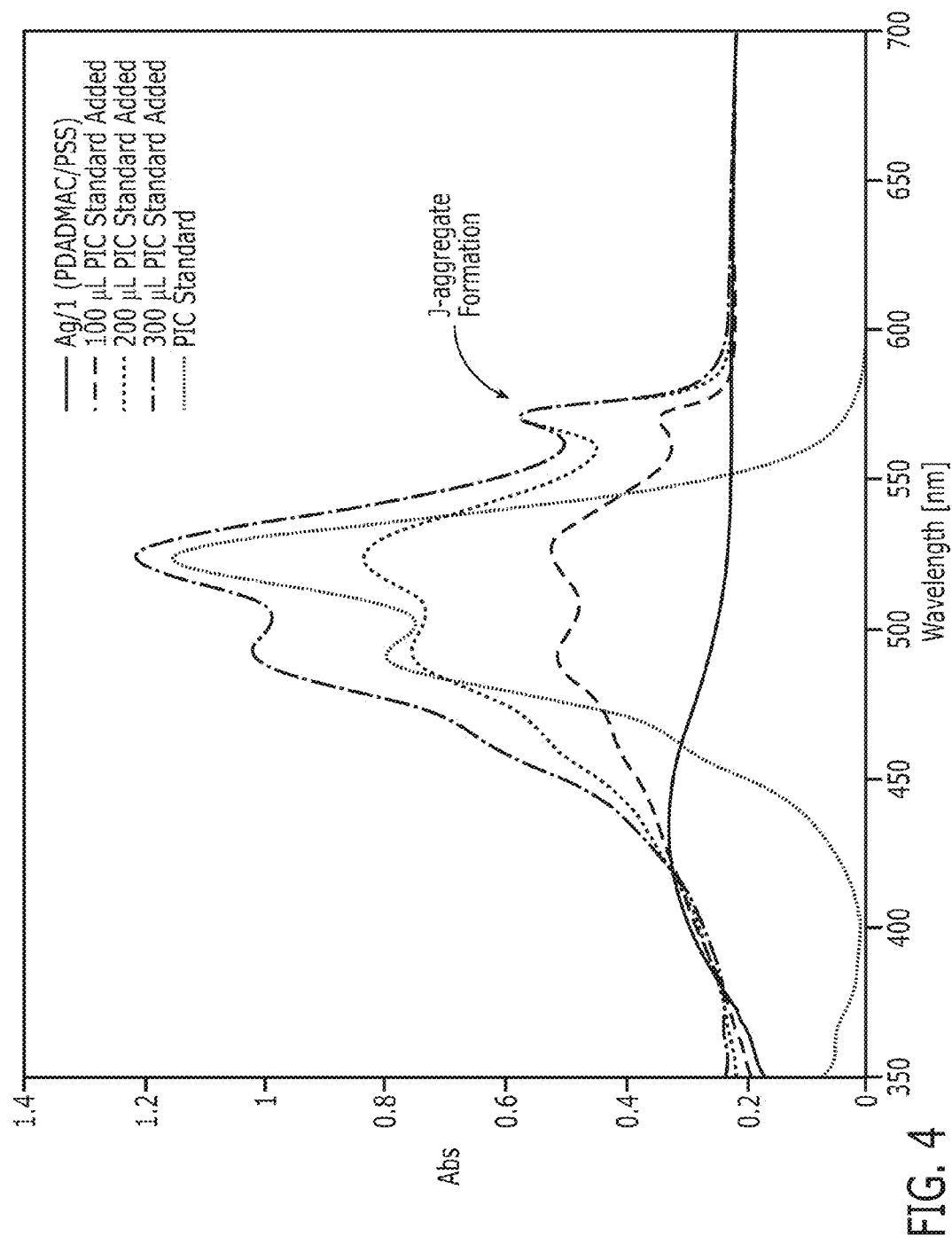
FIG. 4 is a graph of the absorbance spectra of multilayered plexcitonic nanoparticles as taught in the present invention.

Turning to FIG. 4, the absorbance spectra of the multilayered plexcitonic nanoparticles are illustrated. As a control, the absorbance spectrum of Ag/PDADMAC/PSS was determined prior to the addition of PIC. The absorbance spectrum of Ag/PDADMAC/PSS is characterized by a $\lambda_{max}$ at 435 nm; compared to the absorbance spectra of the silver sol displayed in FIG. 3B, it has a somewhat broader absorbance from 600 nm to 700 nm, possibly due to the slight agglomeration of silver core polyelectrolyte shell nanoparticles. As PIC standard was incrementally added, a sharp peak near 570 nm is observed, indicative of J-aggregate formation. It is noted that the concentration of the PIC standard is too low to form J-aggregates in solution; therefore the observed J-aggregation of PIC must be promoted by the presence of the polyelectrolyte shell. J-aggregate peaks at 570 nm, 571 nm, and 571 nm were observed after the sequential addition of 100 μL, 200 μL, and 300 μL of PIC standard, respectively. Typically, when fully aggregated, the J-aggregate of PIC is characterized by an absorbance at 575 nm. Based on the theoretical model of the J-aggregate absorbance wavelength, the conclusion is that the PIC shell as illustrated here is not in a fully aggregated form.

Figure 5A:
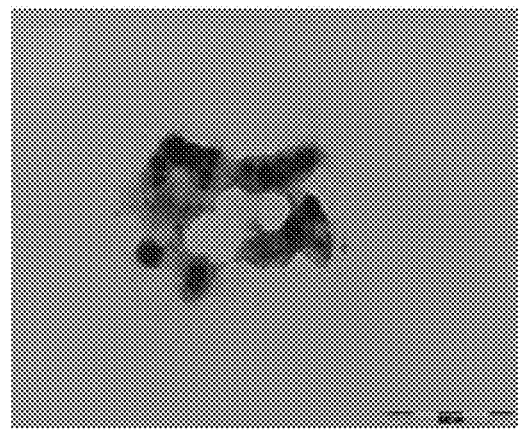
FIG. 5A is a TEM image of silver polyelectrolyte nanoparticles after soaking in PIC for 24 hours.
Figure 5B:
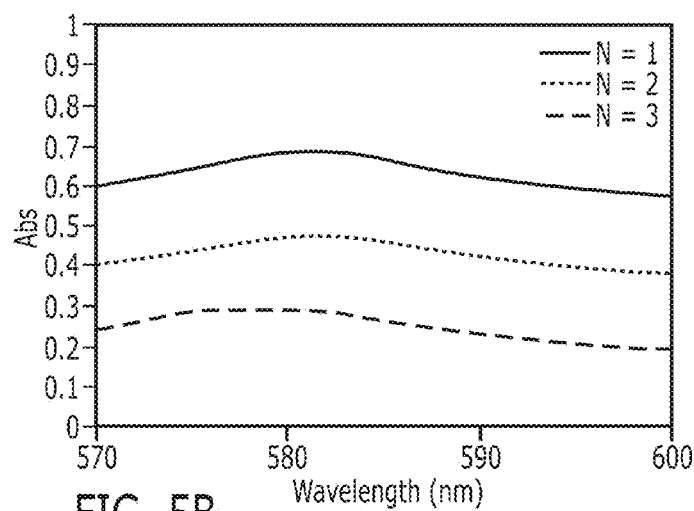
FIG. 5B is a graph of the absorbance spectra of PIC coated silver core polyelectrolyte shell nanoparticles having varying polyelectrolyte layer thickness.
Figure 5C:
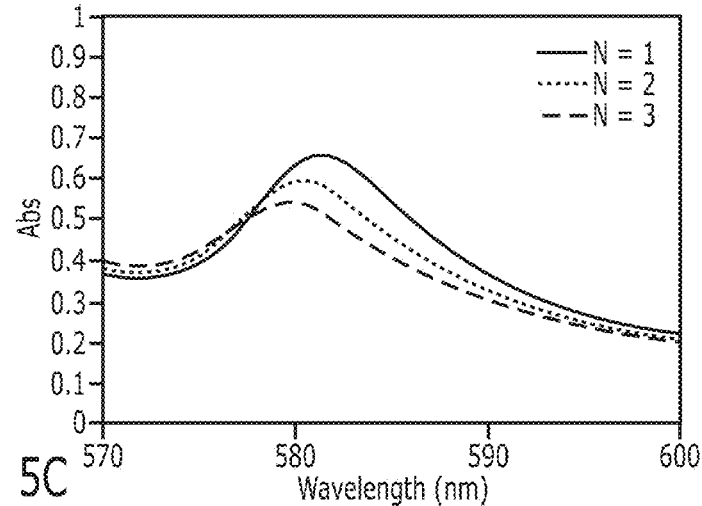
FIG. 5C is a graph showing the absorbance spectra resulting from different spacer layer thickness in accordance with the present invention.

Turning to FIGS. 5A-C, the impact of spacer layer thickness is illustrated. This was achieved by adsorbing PIC to Ag/polyelectrolyte composite nanoparticles composed of one, two, and three PDADMAC/PSS bi-layers, respectively. In this set of experiments, formation of a fully aggregated PIC shell was promoted by exposing Ag/polyelectrolyte composite nanoparticle suspensions to PIC dye for 24 hours. A TEM image of the nanoparticles is provided in FIG. 5A. The presence of the organic dye adsorbed onto the surface of the silver nanoparticles is clearly visible.

FIG. 5B shows the absorbance spectra of PIC coated Ag core-polyelectrolyte shell nanoparticles, with varying polyelectrolyte layer thickness. The curve having the largest values was produced from two alternating layers of PDADMAC and PSS (denoted as N=1 for one shell). The curve with the lowest values was produced from six alternating layers of PDADMAC and PSS (N=3), and the curve in the middle corresponds to four alternating layers of PDADMAC and PSS (N=2). Thus, the addition of alternating layers of PDADMAC and PSS from two, to four, to six (that is, and increase in layer thickness), produces a predictable change in the absorbance spectra of the PIC coated Ag core, polyelectrolyte shell nanoparticles based on layer thickness. Formation of the red-shifted J-aggregate peak was observed at 581 nm, 581 nm, and 579 nm for the two-, four-, and six-layer nanoparticles, respectively (corresponding to N=1, 2, 3).

FIG. 5C shows the absorbance spectra resulting from different spacer layer thickness. The spectra is characterized by the formation of a red-shifted J-aggregate peak at 581 nm, 581 nm, and 579 nm for Ag particles coated with one, two, and three PDADMAC/PSS shells, respectively (corresponding to N=1, 2, 3).

The J-aggregate peaks were observed at wavelengths that were comparatively longer than what is commonly reported in the literature for PIC, in particular 575 nm. Additionally, the J-aggregate peak wavelength was found to increase with decreasing spacer thickness. These results suggest that the PIC was fully, or close to fully aggregated, and that the plasmon-exciton interaction further red shifted the J-aggregate peak. This observation is consistent with the fact that plasmon-exciton interactions are enhanced as the distance between the J-aggregate shell and the Ag core particles is diminished.

Turning to FIG. 5C, simulated absorbance spectra of the nanoparticles were calculated to explain the main absorption features of the experimental data. For the dielectric constants, experimental frequency-dependent complex dielectric constant for the silver were used as reported in E. D. Palik, Handbook of Optical Constants of Solids (Academic, 1985). Literature values of 2.25 for PDADMAC and 2.56 for PSS as reported in Y. Zang, F. Xu, X. Su, and W. Knoll, "Quartz crystal microbalance with integrated surface plasmon grating coupler," Anal. Chem. 80(13), 5246-5250 (2008). Equation (7) was used with f=0.35 and γ=0.015 for the PIC J-aggregate. A silver core of 54.5 nm (with SD=9.8 nm), a J-aggregate dye outer shell of 5 nm, and a polyelectrolyte spacer of thickness 1 nm per bi-layer was assumed for the purposes of these calculations. This is consistent for similar structures, in which the thickness of the polyelectrolyte bi-layers was determined to be 1.7 to 3.0 nm. The simulation result in FIG. 5C was in qualitative agreement with the experimental absorbance spectra in FIG. 5B. Namely, the experimental and simulation results demonstrate the dependence of coupling strength and shift of the exciton frequency on spacer layer thickness. The red-shifted energy of the J-aggregate peak increases as the spacer layer thickness is minimized. That is, the plasmon-exciton interaction is maximized. Discrepancies between the experimental and simulated results, in terms of J-aggregate peak shape, may be attributed to the fact that non-spherical and/or aggregated particles were not included in the simulated results.

In conclusion, multilayered plexcitonic nanoparticles composed of a silver core, polyelectrolyte spacer layer, and a PIC outer shell may be synthesized as taught herein. Through measurements of the optical properties in the ultraviolet and visible regions of the composite nanoparticles in aqueous solution, the absorbance spectra demonstrate that PDADMAC/PSS spacer layers successfully promote the J-aggregation of PIC. The in situ generation of the J-aggregate was observed when PIC standard was added directly to a colloidal suspension containing silver core polyelectrolyte shell composite nanoparticles. The formation of the fully J-aggregated form was observed when PIC was exposed to a colloidal suspension of silver core polyelectrolyte shell nanoparticles for 24 hours. The 24-hour study yielded a J-aggregate absorbance at 579-581 nm, indicating the formation of a fully aggregated dye on the surface of the composites. The fully aggregated form of PIC is typically observed at 575 nm. The additional red-shift in energy that was experimentally observed may be explained by the plasmon-exciton interaction between the silver core and the J-aggregate exterior. It is concluded that the use of oppositely charged polyelectrolytes is a useful approach for inducing the formation of J-aggregates on silver core-polyelectrolyte shell particles. Furthermore, polyelectrolyte spacer layers are a means of controlling the plasmon-exciton distance, which can ultimately be used to control the shift in exciton frequency. Finally, the ease with which polyelectrolyte layers are assembled onto colloidal nanoparticles of varying shape and composition, makes this technique suitable for building a wide range of plexcitonic particles.

While specific exemplary embodiments of the invention have been described, it will be understood that additional embodiments and various modifications may be made without departing from the spirit and scope of the invention. For example, in terms of particle shape, a range of metallic core shapes may be fabricated in addition to the spheres as illustrated herein, including but not limited to rods and platelets. Methods steps can be performed in a different order or with a variation in the composition ratios or percentages of the materials, and additional materials can be added. Accordingly, these and other embodiments of the invention fall within the scope of the claims below.

What is claimed is:

1. Multilayered plexcitonic nanoparticles, comprising:
   a silver core;
   a polyelectrolyte spacer layer exterior to said silver core; and
   a J-aggregate cyanine dye outer shell exterior to said polyelectrolyte spacer layer.

2. The multilayered plexcitonic nanoparticles of claim 1, wherein said polyelectrolyte spacer layer exterior to said silver core comprises an inner layer of PDADMAC polyelectrolytes and an outer layer of PSS polyelectrolytes.

3. The multilayered plexcitonic nanoparticles of claim 1, wherein said J-aggregate cyanine dye outer shell exterior to said polyelectrolyte spacer layer comprises PIC.

4. The multilayered plexcitonic nanoparticles of claim 3, wherein said J-aggregate cyanine dye outer shell exterior to said polyelectrolyte spacer layer is formed by adsorbing a cationic form of PIC onto said outer layer of PSS polyelectrolytes.

5. A method of making multilayered plexcitonic nanoparticles, comprising the steps of:
   preparing silver nanoparticles by chemically reducing positively charged silver ions in aqueous solution to form a silver colloidal suspension;
   preparing a standard solution of PIC;
   forming silver core polyelectrolyte shell nanoparticles by adding alternating layers of PDADMAC and PSS to said silver colloidal suspension; and
   generating a J-aggregate shell on said silver core polyelectrolyte shell nanoparticles by incrementally adding said standard solution of PIC to said silver core polyelectrolyte shell nanoparticles until absorbance measurements yield an approximate absorbance of 0.5 to 1.5 absorbance units.

6. The method of claim 5, wherein said step of preparing silver nanoparticles by chemically reducing positively charged silver ions in aqueous solution further comprises adding drop-wise a trisodium citrate solution to AgNO3 in deionized water while heating and stirring.

7. The method of claim 5, wherein said step of preparing a standard solution of PIC further comprises dissolving a ratio of approximately 25 mg of PIC per 100 mL of phosphate buffer.

8. A method of making multilayered plexcitonic nanoparticles, comprising the steps of:
   preparing silver nanoparticles by chemically reducing positively charged silver ions in aqueous solution to form a silver colloidal suspension;
   preparing a standard solution of PIC;
   forming silver core polyelectrolyte shell nanoparticles by adding a first layer of PDADMAC and a second layer of PSS to the silver colloidal suspension;
   placing said silver core polyelectrolyte shell nanoparticles in a centrifuge tube;
   adding an approximate equal amount by volume of PIC standard to said silver core polyelectrolyte shell nanoparticles in the centrifuge tube;
   allowing the PIC standard and silver core polyelectrolyte shell nanoparticles in the centrifuge tube to sit for a period of time that results in adequate adsorption and aggregation of the PIC standard onto the surface of the particles to form multilayered plexcitonic nanoparticles; and
   removing excess PIC from the centrifuge tube by centrifugation.

9. The method of claim 8, wherein said period of time is between 4 and 48 hours.

10. The method of claim 8, wherein said period of time is between 20 and 28 hours.

11. The method of claim 8, wherein said period of time is approximately 24 hours.

\* \* \* \* \*